United States Patent
Liu et al.

(10) Patent No.: US 11,552,551 B2
(45) Date of Patent: Jan. 10, 2023

(54) METHOD OF CONTROL OF A SYSTEM COMPRISING A SINGLE-PHASE THREE-LEVEL T TYPE QUASI-Z SOURCE INVERTER CONNECTED TO AN LC FILTER WHICH IS IN TURN CONNECTED TO A LOAD

(71) Applicant: City University, Kowloon (HK)

(72) Inventors: Chunhua Liu, Kowloon (HK); Yuxin Liu, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 17/330,384

(22) Filed: May 25, 2021

(65) Prior Publication Data

US 2022/0385191 A1 Dec. 1, 2022

(51) Int. Cl.
*H02M 1/12* (2006.01)
*H02M 7/487* (2007.01)

(52) U.S. Cl.
CPC ........... *H02M 1/126* (2013.01); *H02M 7/487* (2013.01)

(58) Field of Classification Search
CPC .............................. H02M 7/487; H02M 1/126
See application file for complete search history.

(56) References Cited

U.S. PATENT DOCUMENTS

| | | | | |
|---|---|---|---|---|
| 10,374,522 B2* | 8/2019 | Liu | ........................ | H02M 7/487 |
| 10,879,839 B2* | 12/2020 | Ayyanar | .................. | H02J 3/383 |
| 2013/0329477 A1* | 12/2013 | Vinnikov | .............. | H02M 7/523 363/132 |
| 2017/0229871 A1* | 8/2017 | Liu | ........................ | H02J 3/383 |

* cited by examiner

*Primary Examiner* — Jue Zhang

(57) ABSTRACT

A method relating to control of a system including a single-phase three-level quasi-Z type source inverter connected to an LC filter which is in turn connected to a load, the inverter including first and second bridge arms, each including a plurality of switches, the method including the steps of (a) for each of a plurality of consecutive sampling periods (i) determining the duration of a shoot-through period for the next sampling period during which the inverter is in shoot-through mode; (ii) choosing a configuration of the switches for the next sampling period (iii) at the end of the sampling period setting the switches in the chosen configuration for the next sampling period; and (b) at a time during the next sampling period and for the duration of the shoot-through period setting the switches such that the inverter is in shoot-through mode.

16 Claims, 7 Drawing Sheets

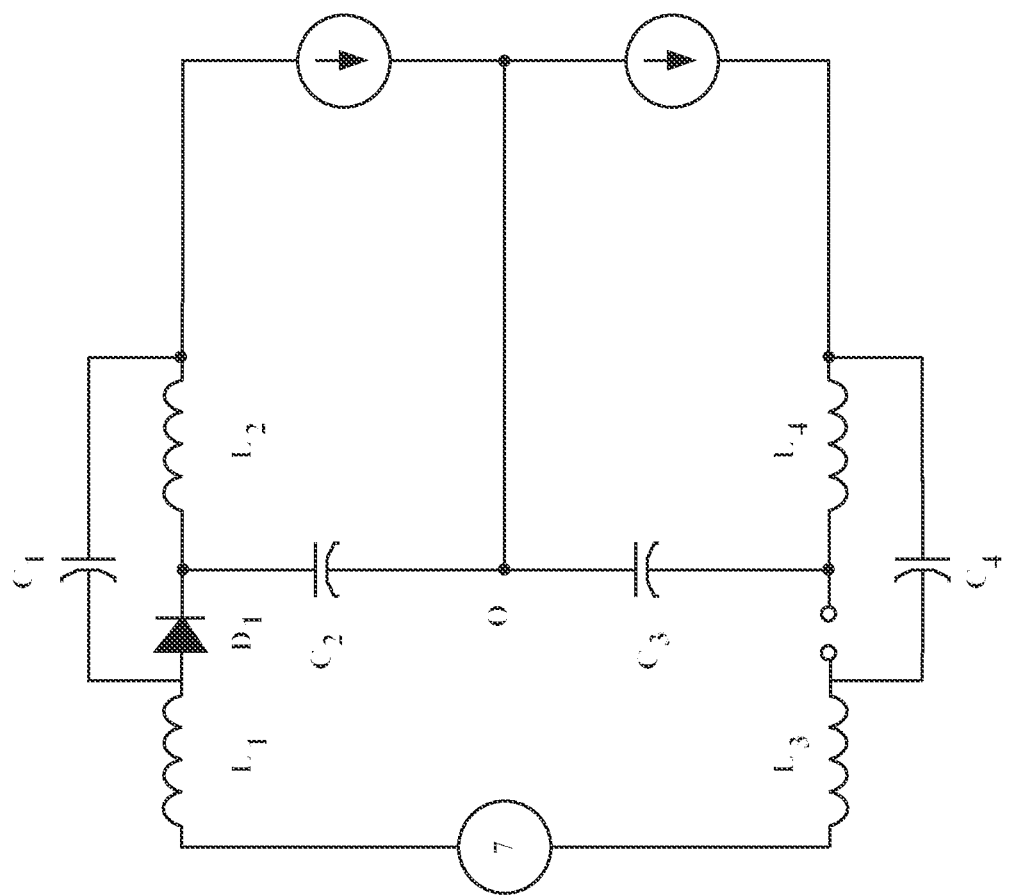

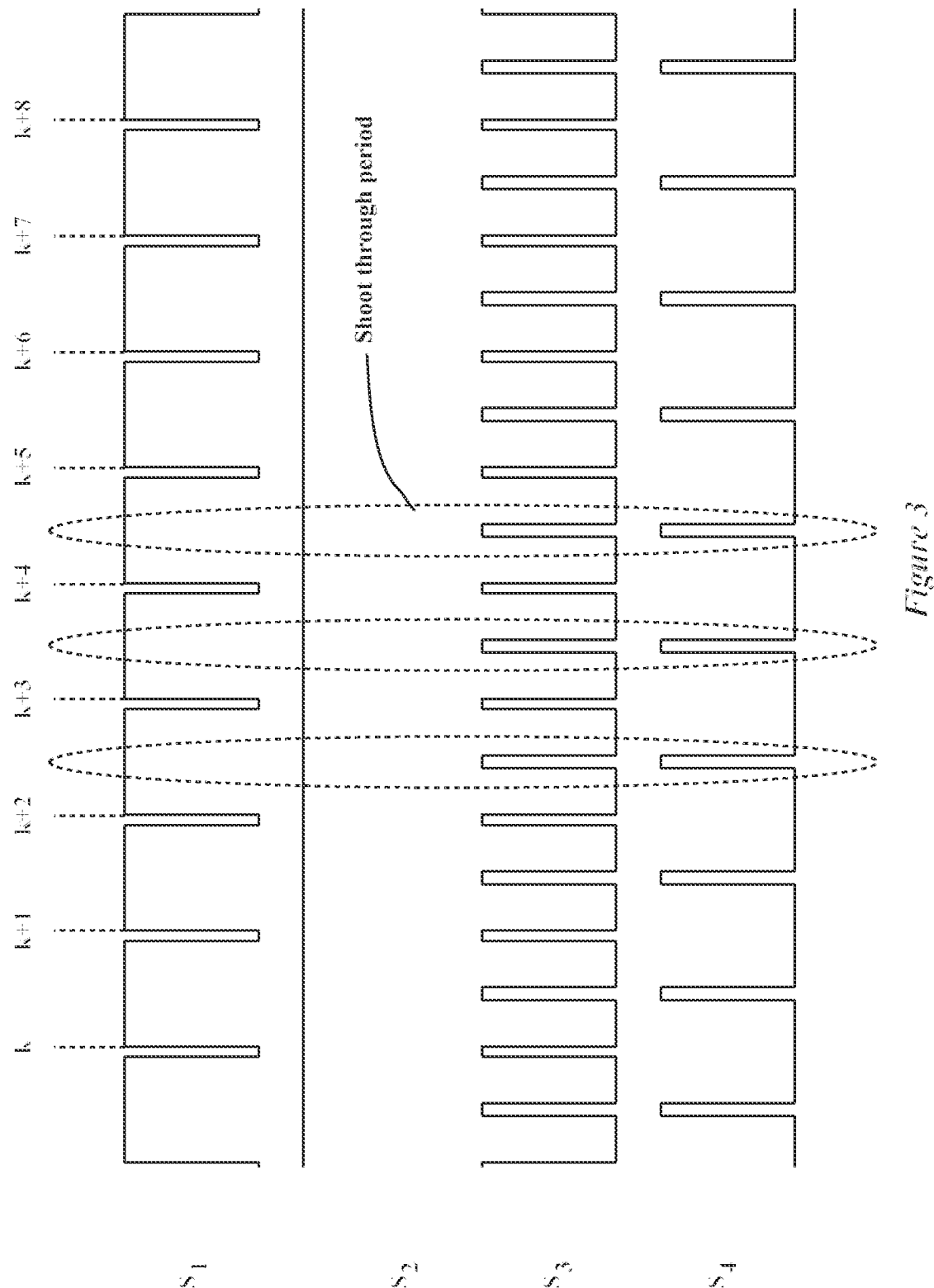

METHOD OF CONTROL OF A SYSTEM COMPRISING A SINGLE-PHASE THREE-LEVEL T TYPE QUASI-Z SOURCE INVERTER CONNECTED TO AN LC FILTER WHICH IS IN TURN CONNECTED TO A LOAD

The present invention relates to a method of control of a system comprising a single-phase three-level quasi-Z type source inverter connected to an LC filter which is in turn connected to a load. More particularly, but not exclusively, the present invention relates to a method of control of a system comprising a single-phase three-level quasi-Z type source inverter connected to an LC filter which is in turn connected to a load, the inverter comprising first and second bridge arms, each comprising a plurality of switches, the method comprising the steps of (a) for each of a plurality of consecutive sampling periods (i) determining the duration of a shoot-through period for the next sampling period during which the inverter is in shoot-through mode; (ii) choosing a configuration of the switches for the next sampling period (iii) at the end of the sampling period setting the switches in the chosen configuration for the next sampling period; and (b) at a time during the next sampling period and for the duration of the shoot-through period setting the switches such that the inverter is in shoot-through mode.

Single phase T type three level inverters are known. In order to boost the DC voltage of such devices one must employ a front end DC/DC circuit. This is inconvenient and expensive and reduces the use of such devices.

The present invention seeks to overcome the problems of the prior art.

Accordingly, the present invention provides a method of control of a system comprising a single-phase three-level T type quasi-Z source inverter connected to an LC filter which is in turn connected to a load the single-phase three-level T type quasi-Z source inverter comprising first and second power rails;

first and second quasi-Z source networks, each quasi-Z source network comprising first, second and third arms connected together at a central point, the first arm comprising an inductor and a diode connected in series, the second arm comprising an inductor and the third arm comprising a trunk capacitor; each quasi-Z source network further comprising a capacitor connected across the diode of the first arm and the inductor of the second arm;

the first and second arms of the first quasi-Z source network being connected in series in the first power rail and the first and second arms of the second quasi-Z source network being connected in series in the second power rail, the third arms of the two quasi-Z source networks being connected together at a common point (O);

first and second T type three level bridge arms, each bridge arm comprising a plurality of switches, each bridge arm being connected between the first and second power rails and common point P; each switch arm being configured such that the inverter can be switched between a shoot-through mode in which the common point (O) is short circuited with at least one of the first power pail and second power rail and a plurality of non-shoot-through modes in which none of the first and second power rails and common point O are short circuited together by changing the configuration of the switches, each bridge arm comprising an output terminal;

the LC filter comprising first and second filer input ports and first and second output ports, the first and second input ports being connected to the output terminals of the bridge arms, the first and second output ports being connected to the load;

the method comprising the steps of (a) for each of a plurality of consecutive sampling periods
  (i) determining the duration of a shoot-though period for the next sampling period during which the inverter is in the shoot-through mode; and
  (ii) choosing a configuration of the switches for the next sampling period
  (iii) at the end of the sampling period setting the switches in the chosen configuration for the next sampling period; and, (b) at a time during the next sampling period and for the duration of the shoot-through period setting the switches such that the inverter is in shoot-through mode By employing the method according to the invention one can boost the DC voltage without the use of a front end DC/DC circuit. There is also no need to include dead time for control signals and so the inverter can work at a higher switching frequency.

Preferably the switches are set such that the shoot-through period occurs in the center of the next sampling period.

Preferably the step of determining the duration of the shoot-through period for the next sampling period comprises the steps of (a) in the sampling period summing the voltages across the two trunk capacitors to produce a voltage sum
(b) comparing the voltage sum to a reference voltage sum; and,
(c) determining the duration of the shoot-through period based on the comparison.

Preferably the step of determining the duration of the shoot through period based on the comparison comprises providing the voltage sum and reference voltage sum to a PI controller, the output of the PI controller determining the shoot through period.

Preferably the output of the PI controller is voltage limited.

Preferably the LC filter comprises a first filter line extending from the first filter input to the first filter output, a second filter line extending from the second filter input to the second filter output, a filter inductor connected in series in the first filter line and a filter capacitor connected between the first filter line and second filter line.

Preferably the step of determining the configuration of the switches for the next sampling period comprises:

(a) for each switch configuration m in a set of possible switch configurations:
  (i) predicting the current in the filter inductor in the next sampling period k+1,
  (ii) predicting the voltage difference between the two trunk capacitors in the next sampling period k+1, and,
  (iii) calculating a cost function for the switch configuration based at least partly on the predicted current in the filter inductor in the next sampling period and the predicted voltage difference between the two trunk capacitors in the next sampling period; and,
(b) selecting a switch configuration from the set of possible switch configurations based on the cost function for each switch configuration.

Preferably the selected switch configuration has the lowest cost function.

Preferably for each switch configuration m in the set of possible switch configurations the voltage difference between the two trunk capacitors in the next sampling period is predicted according to the formula $$\Delta u_c(k+1)_m = \Delta u_c(k) + \frac{T_r}{C_T} d_m i_L(k)$$

where $\Delta u_c(k+1)_m$ is the voltage difference between the trunk capacitors in the next sampling period k+1 for switch configuration m;

$\Delta u_c(k)$ is the voltage difference between the trunk capacitors in the current sampling period k;

$T_r$ is the non-shoot-through time which is the difference between the duration of the sampling period and duration of the determined shoot-through time for the next sampling period;

$C_T$ is the capacitance of each of the trunk capacitors;

$i_L(k)$ is the current in the filter inductor in the current sampling period; and, $d_m$ is the neutral point current direction symbol for switch configuration m.

Preferably for each switch configuration m in the set of possible switch configurations the current in the filter inductor in the next sampling period k+1 is predicted according to the formula $$i_L(k+1)_m = \left(1 - \frac{T_s R_L}{L_f}\right) i_L(k) + \frac{T_r}{L_f} u_m(k) - \frac{T_s}{L_f} u_{cf}(k)$$

where $i_L(k+1)_m$ is the current in the filter inductor in the next sampling period for switch configuration m;

$T_s$ is the duration of the sampling period;

$R_L$ is the resistance of the load;

$L_f$ is the inductance of the filter inductor;

$i_L(k)$ is the current in the filter inductor in the current sampling period k;

$T_r$ is the non-shoot-through time which is the difference between the duration of the sampling period and duration of the determined shoot-through time for the next sampling period;

$u_m(k)$ is the output voltage between the output terminals of the bridge arms in the current sampling period for switch configuration m; and, $u_{cf}(k)$ is the load voltage in the current sampling period.

Preferably the cost function is $$g = k_1[i_{ref}(k+1) - i_L(k+1)_m]^2 + k_2[0 - \Delta u_c(k+1)_m]^2$$

where k1 and k2 are weighting coefficients;

$i_{Lref}(k+1)$ is a predicted reference value for the current in the filter inductor in the next sampling period;

$i_L(k+1)_m$ is the predicted value for the current in the filter inductor in the next sampling period for switch configuration m; and, $\Delta u_c(k+1)_m$ is the voltage difference between the trunk capacitors in the next sampling period k+1 for switch configuration m.

Preferably the predicted reference value of the current in the filter inductor in the next sampling period $i_{Lref}(k+1)$ is predicted based on a comparison of the load voltage in the current sampling period with a reference load voltage.

Preferably the comparison is performed by providing the load voltage and the reference load voltage to a PR controller, the output of the PR controller being the predicted reference value of the current in the next sampling period.

The shoot-through mode can be a full shoot-through mode in which both the first and second power rails are short circuited to the common point (O).

Alternatively the shoot-through mode can be an upper shoot-through mode in which the first power rail is short circuited to the common point (O).

Alternatively the shoot-through mode can be a lower shoot-through mode in which the second power rail is short circuited to the common point (O).

BRIEF DESCRIPTION OF DRAWINGS

The present invention will now be described by way of example only and not in any limitative sense with reference to the accompanying drawings in which

FIGS. 2(a) to 2(d) show the inverter of the system of FIG. 1 in non shoot through mode, upper shoot through mode, lower shoot through mode and full shoot through mode respectively;

FIG. 3 shows the configuration of the switches of the inverter over a plurality of sampling periods; and, FIG. 4 shows the method according to the invention in schematic form.

Figure 1:
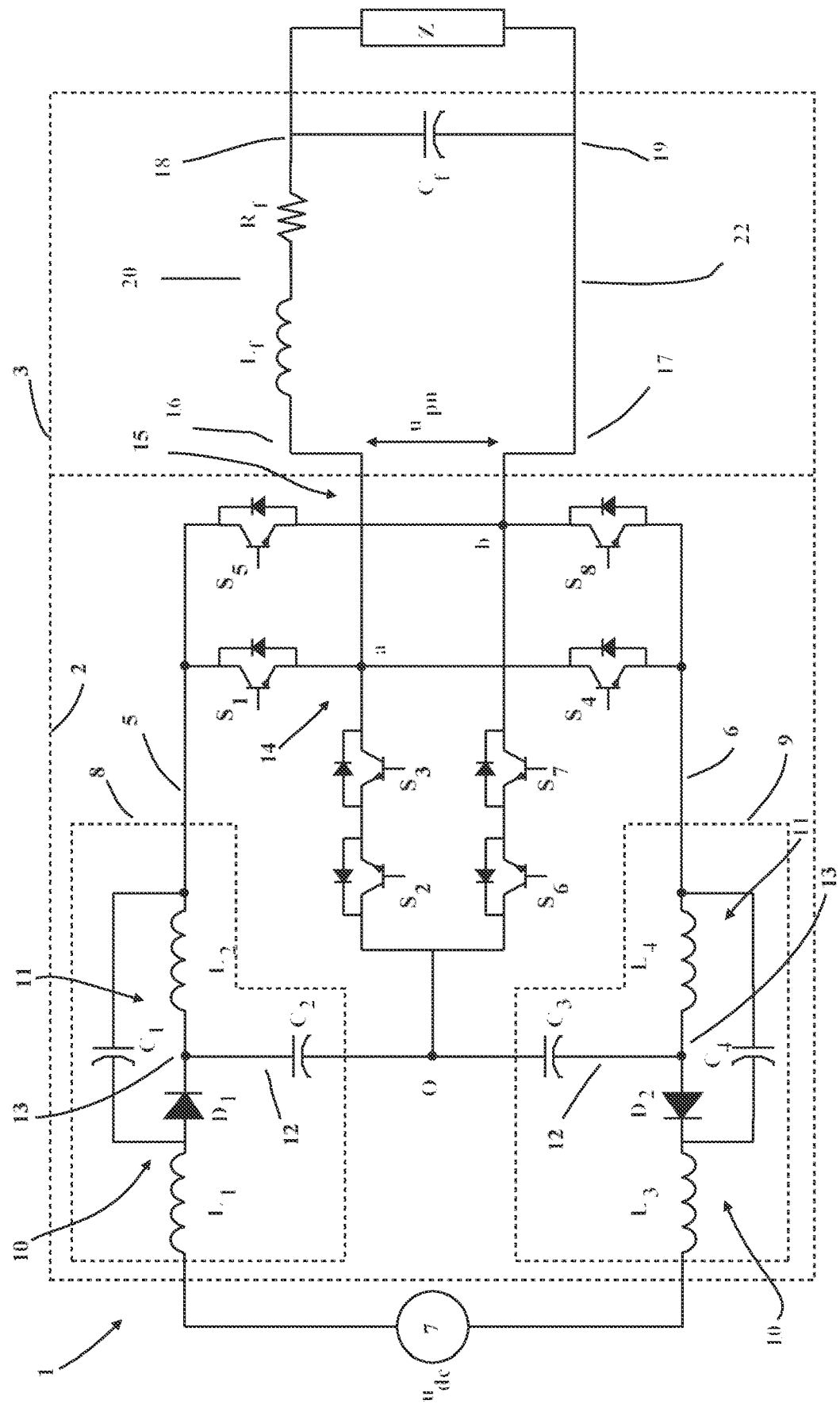
FIG. 1 shows a system controlled by the method according to the invention.

Shown in FIG. 1 is a system 1 controlled by the method according to the invention. The system 1 comprises a single-phase three level T-type quasi-Z source inverter 2. Connected to the inverter 2 is an LC filter 3 which is in turn connected to a load Z.

The single-phase three level T type quasi-Z source inverter 2 comprises first and second power rails 5,6. Connected between the power rails 5,6 is a DC power source 7. The DC power source 7 in this embodiment is a DC power supply. In alternative embodiments the DC power source 7 can for example be a battery or the output of a DC/DC circuit.

The inverter further comprises first and second quasi-Z source networks 8,9. Each quasi-Z source network 8,9 comprises first, second and thirds arms 10,11,12 connected together at a central point 13. Each first arm 10 comprises an inductor L1, L3 and diode D1,D2 connected in series. Each second arm 11 comprises an inductor L2, L4. Each third arm 12 comprises a trunk capacitor C2,C3. Each network 8,9 further comprises a capacitor C1,C4 connected across the diode D1,D2 of the first arm 10 and the inductor L2, L4 of the second arm 11 as shown The first network 8 is arranged with the first and second arms 10,11 in series in the first power rail 5. The second network 9 is arranged with the first and second arms 10,11 in series in the second power rail 6. The third arms 12 are connected together at a common point O as shown.

The inverter 2 further comprises first and second T-type three level bridge arms 14,15. Each bridge arm 14,15 comprises a plurality of switches S1-S8. In this embodiment the switches S1-S8 are IGBT transistors. In alternative embodiments other types of switches S1-S8 are possible such as MOSFETS (including GaN MOSFETS, SI-MOSFET and SiC-MOSFETS), BJT, GTO, MCT SIT and other controllable electronic devices.

Each bridge arm 14,15 is connected between the first and second power rails 5,6 and the common point O as shown. Each bridge arm 14,15 further comprises an output terminal a,b part way along its length. Each output terminal a,b is separated from the first and second power rails 5,6 by at least one switch S1-S8.

Figure 2B:
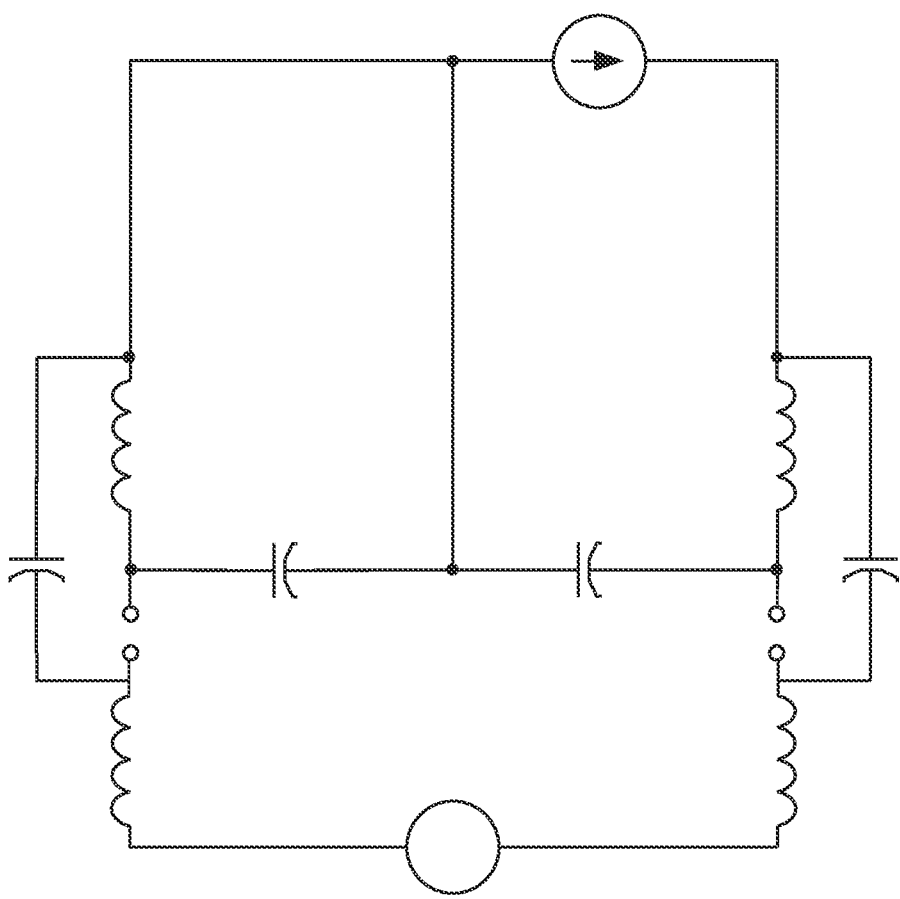
Figure 2C:
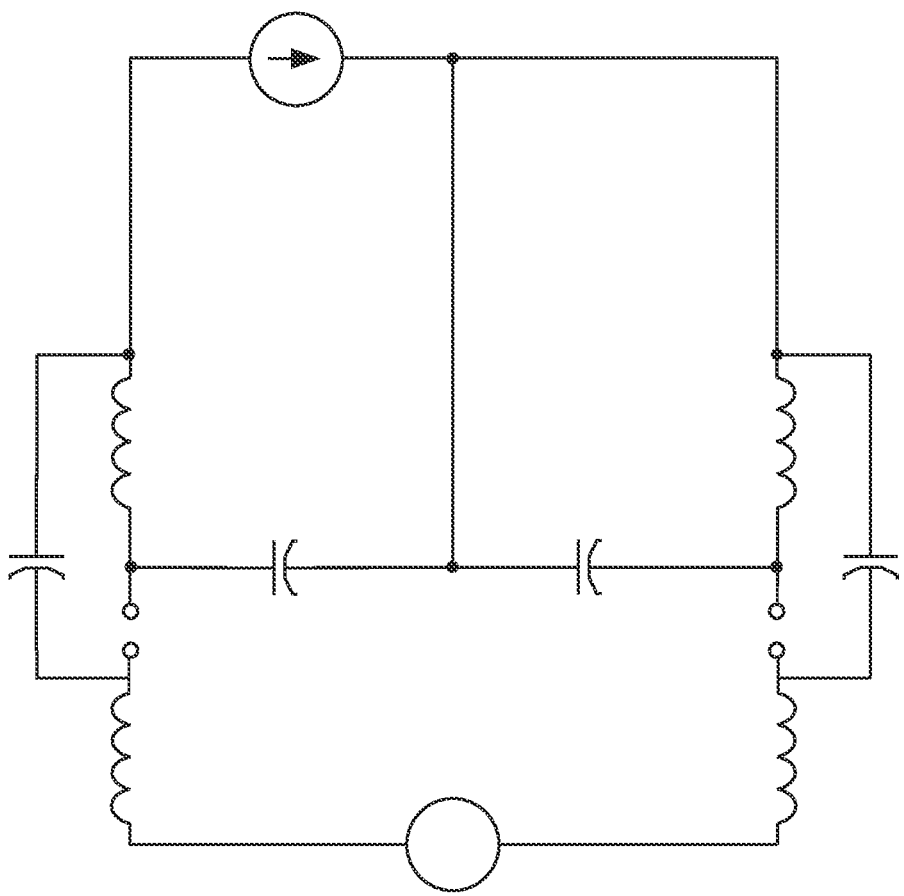
Figure 2D:
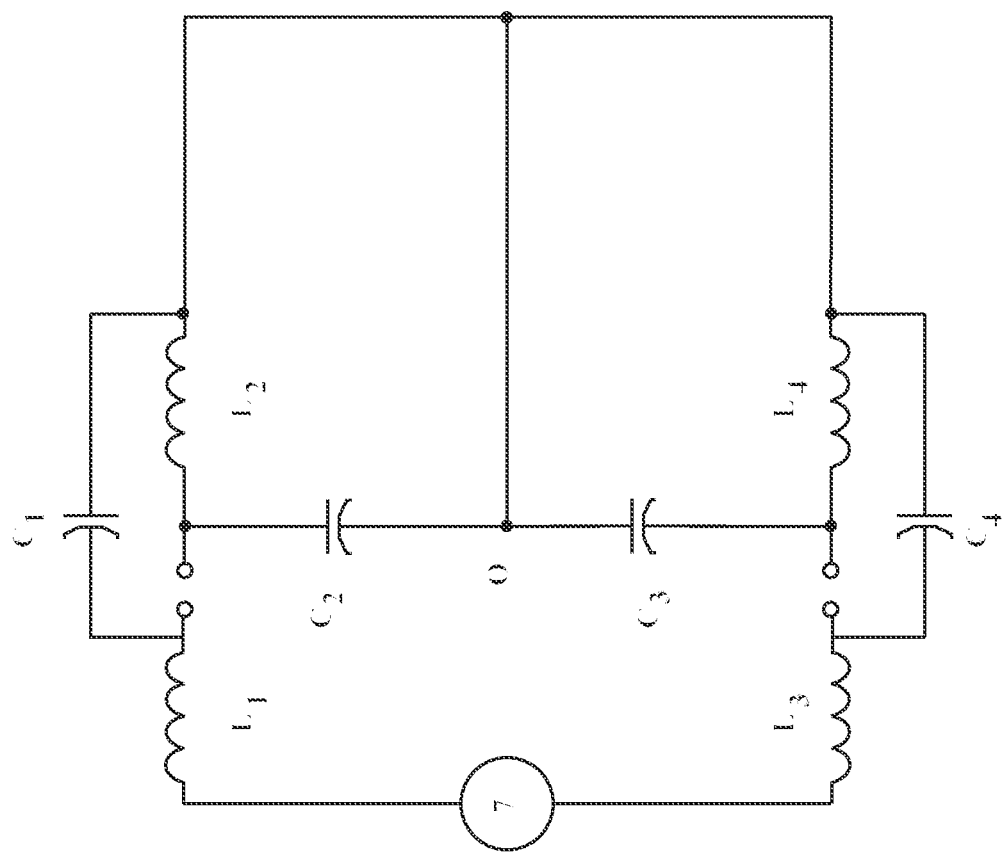

Control of the inverter 2 is achieved by switching the switches S1-S8 between open and closed configurations as is explained in more detail below. In the current embodiment this is achieved by applying voltages to the bases of the transistors. The arms 14,15 are configured such that the inverter 2 can be switched between a shoot-through mode (in this case a full shoot-through mode) in which the first power rail 5, second power rail 6 and common point O are short circuited together and a plurality of non-shoot-through modes in which none of the first and second power rails 5,6 and common point O are short circuited together by changing the configuration of the switches S1-S8. Equivalent circuits for the inverter 2 in a non-shoot-through mode and full shoot-through mode are shown in FIGS. 2(a) and 2(d) respectively.

In the current embodiment of the inverter 2 there are nine different configurations m of the switches S1-S8 in which the inverter 2 is in non-shoot-through mode. Associated with each of these nine switch configurations is a neutral point current direction symbol dm which varies between different configurations m of switches S1-S8. This has the value −1, 0 or +1 depending on the configuration m of switches S1-S8.

The inverter 2 is connected to an LC filter 3. The LC filter 3 comprises first and second inputs 16,17 and first and second outputs 18,19. The first and second inputs 16,17 are connected to the output terminals a,b of the bridge arms 14,15. Connected between the first input 16 and first output 18 is a first filter line 20 having a resistance Rf. Arranged in series in the first filter line 20 is a filter inductor Lf. Connected between the second input 17 and second output 19 is a second filter line 22. Connected between the first and second filter lines 20,22 is a capacitor Cf.

Connected to the first and second outputs 18,19 is a load Z. A number of options for the load Z are possible. The load Z could for example be a single phase permanent magnet synchronous motor. Alternatively, the load Z could be a power grid.

Shown in FIG. 3 in schematic form is the method of control of the system 1 according to the invention. In general terms the method proceeds in a plurality of consecutive sampling periods k, each of duration Ts. In sampling period k the method comprises the steps of determining a shoot through period Tst for the next sampling period k+1 and choosing a configuration m of switches S1-S8 for the next sampling period k+1. At the end of sampling period k the switches S1-S8 are switched to the chosen configuration m for sampling period k+1. The switch configuration m is one in which the inverter 2 is in a non-shoot-through mode. Then at a time during next sampling period k+1 and for the duration of the shoot-through period Tst the switches S1-S8 are set such that the inverter 2 is in shoot-through mode. At the end of this shoot-through period Tst the switches S1-S8 are returned to their original configuration m.

The reason for setting the switches S1-S8 such that the inverter 2 is in shoot-through mode during a portion of a sampling period is that this boosts the DC voltage between the first and second power rails 5,6. If during a sample period of duration Ts the inverter 2 is in shoot-through mode for a shoot-through period of Tst then the voltage upn between the power rails 5,6 at the points where they are connected to the bridge arms is $$u_{pn} = \frac{1}{1-2D} u_{dc}$$

Where Udc is the DC voltage of the DC power source and $$D = \frac{T_{st}}{T_S}$$

D is referred to as the voltage boost.

Shown in FIG. 3 is the state of switches S1 to S4 in a plurality of sampling periods k. As can be seen in each sampling period a shoot-through period is added to obtain the voltage boost. Typically the shoot-through period is inserted in the center of each sampling period k to reduce voltage ripple.

Figure 4:
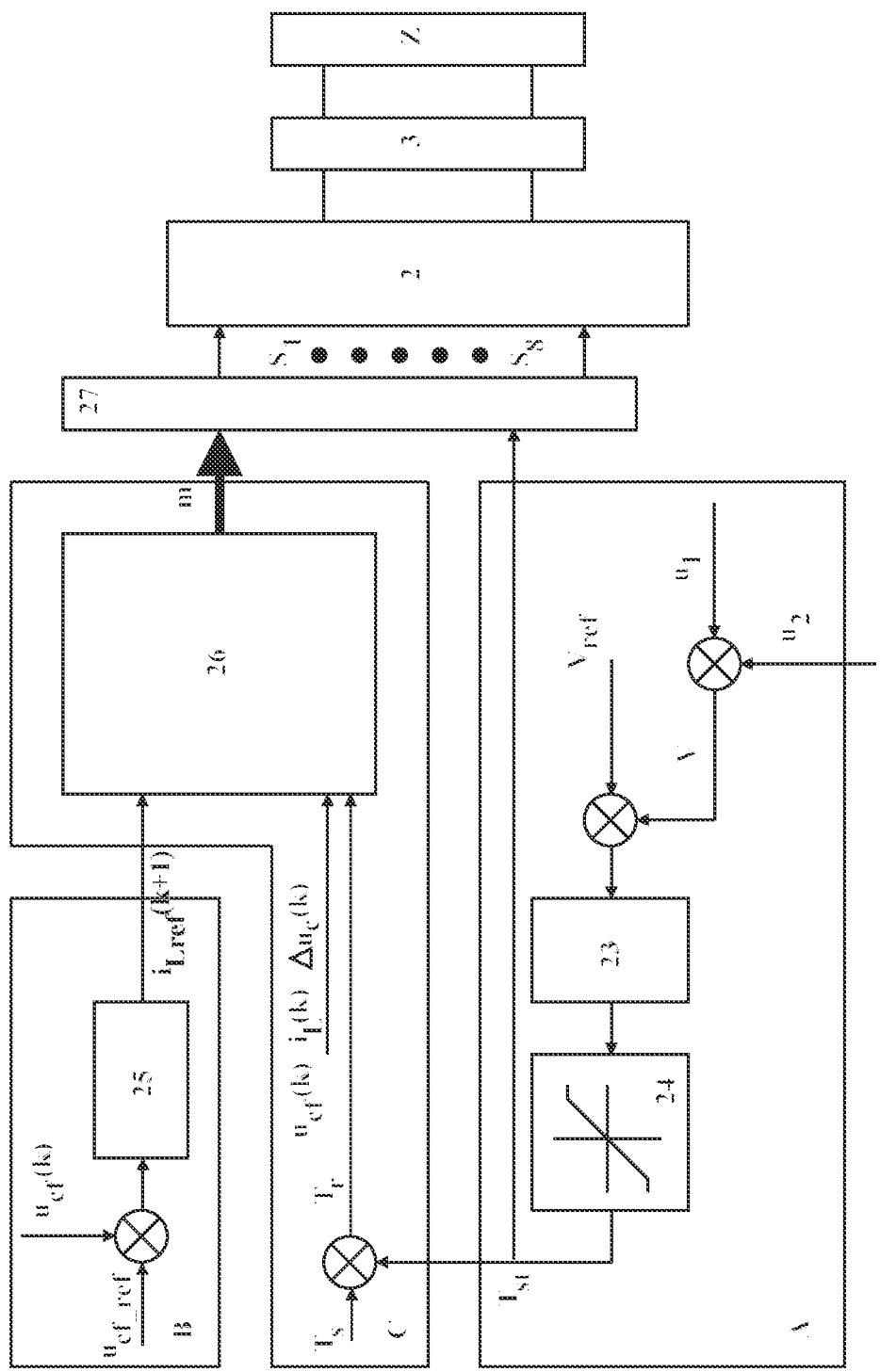

Shown in FIG. 4 in schematic form is an embodiment of a method according to the invention. The step of determining the duration of the shoot-through period Tst for the next sampling period k+1 is shown in block A. In block A in a first step the voltages u1, u2 across the two trunk capacitors C2, C3 are added together to produce a voltage sum V. The voltage sum V and a reference voltage sum Vref are then provided to a PI controller 23 which compares the two and produces an output. The output of the PI controller 23 is then voltage limited by a limiter 24 and the output of the voltage limiter 24 is the shoot through time Tst.

The step of choosing the configuration m of switches S1-S8 for the next sampling period k+1 is performed in blocks B and C.

In block B the predicted reference value $I_{Lref}(k+1)$ of the current in the filter inductor Lf in the next sampling period k+1 is predicted. The load voltage $u_{cf}(k)$ in the current sampling period k along with a reference load voltage $u_{cf\_ref}$ are provided to a PR controller 25. The output of the PR controller 25 is the predicted reference value of the current $I_{Lref}(k+1)$ in the filter inductor Lf in the next sampling period (k+1).

In block C in a first step the shoot-through period Tst for the next sampling period (k+1) is subtracted from the duration of the sampling period Ts to produce a non-shoot-through time Tr. Then, in a model selection stage 26 for each switch configuration m in a set of possible switch configurations one performs the steps of predicting the current $I_L(k+1)_m$ in the filter inductor Lf in the next sampling period k+1;
(ii) predicting the voltage difference $\Delta u_c(k+1)_m$ between the two trunk capacitors C2, C3 in the next sampling period k+1; and,
(iii) calculating a cost function g for the switch configuration m based at least partly on the predicted current $I_L(k+1)_m$ in the filter inductor Lf in the next sampling period (k+1) and the predicted voltage difference $\Delta u_c(k+1)_m$ between the two trunk capacitors C2, C3 in the next sampling period (k+1);

Finally, one selects a switch configuration m from the set of possible switch configurations based on the cost function g for each switch configuration m. Typically, the cost function g is designed such that one chooses the switch configuration m having the lowest cost function g.

Once the switch configuration m for the next sampling period (k+1) has been chosen it is passed to a controller 27 which sets the switches S1-S8 accordingly at the start of the next sampling period k. The shoot-through time Tst is also passed to the controller 27 so that the controller 27 can insert the shoot-through mode in the next sampling period (k+1) at the appropriate point.

In the above model selection stage 25 the voltage difference $\Delta u_c(k+1)_m$ between the two trunk capacitors C1,C2 in the next sampling period (k+1) is predicted according to the formula $$\Delta u_c(k+1)_m = \Delta u_c(k) + \frac{T_r}{C_T} d_m i_L(k)$$

The current in the filter inductor in the next sampling period is predicted according to the formula $$i_L(k+1)_m = \left(1 - \frac{T_s R_L}{L_f}\right) i_L(k) + \frac{T_r}{L_f} u_m(k) - \frac{T_s}{L_f} u_{cf}(k)$$

The cost function employed is $$g = k_1 [i_{Lref}(k+1) - i_L(k+1)_m]^2 + k_2 [0 - \Delta u_c(k+1)_m]^2$$

where $\Delta u_c(k+1)_m$ is the voltage difference between the trunk capacitors in the next sampling period k+1 for switch configuration m;

$\Delta u_c(k)$ is the voltage difference between the trunk capacitors in the current sampling period k;

$T_r$ is the non-shoot-through time which is the difference between the duration of the sampling period Ts and duration of the determined shoot-through time Tst for the next sampling period (k+1);

$C_T$ is the capacitance of each of the trunk capacitors C2,C3;

$i_L(k)$ is the current in the filter inductor Lf in the current sampling period k;

$d_m$ is the neutral point current direction symbol for switch configuration m.

$i_L(k+1)_m$ is the current in the filter inductor Lf in the next sampling period (k+1) for switch configuration m;

$T_s$ is the duration of the sampling period;

$R_L$ is the resistance of the load Z;

$L_f$ is the inductance of the filter inductor;

$u_m(k)$ is the output voltage between the output terminals a,b of the bridge arms 14,15 in the current sampling period k for switch configuration m;

$u_{cf}(k)$ is the load voltage in the current sampling period k.

k1 and k2 are weighting coefficients; and, $i_{Lref}(k+1)$ is a predicted reference value for the current in the filter inductor Lf in the next sampling period (k+1).

In the above embodiment of the invention the inverter employs a full shoot-through mode. In an alternative embodiment of the invention the inverter employs an upper shoot-through mode in which the first power rail only is short circuited to the common point (O). This is shown in FIG. 2(b). In a further alternative embodiment of the invention the inverter employs a lower shoot-through mode in which the second power rail only is short circuited to the common point (O). This is shown in FIG. 2(c).

The invention claimed is:

1. A method of control of a system comprising a single-phase three-level T type quasi-Z source inverter connected to an LC filter which is in turn connected to a load the single-phase three-level T type quasi-Z source inverter comprising:

first and second power rails;

first and second quasi-Z source networks, each quasi-Z source network comprising first, second and third arms connected together at a central point, the first arm comprising an inductor and a diode connected in series, the second arm comprising an inductor and the third arm comprising a trunk capacitor; each quasi-Z source network further comprising a capacitor connected across the diode of the first arm and the inductor of the second arm;

the first and second arms of the first quasi-Z source network being connected in series in the first power rail and the first and second arms of the second quasi-Z source network being connected in series in the second power rail, the third arms of the two quasi-Z source networks being connected together at a common point (O);

first and second T type three level bridge arms, each bridge arm comprising a plurality of switches, each bridge arm being connected between the first and second power rails and common point O; each switch arm being configured such that the inverter can be switched between a shoot-through mode in which the common point (O) is short circuited with at least one of the first power rail and second power rail and a plurality of non-shoot-through modes in which none of the first and second power rails and common point O are short circuited together by changing the configuration of the switches, each bridge arm comprising an output terminal;

the LC filter comprising first and second filer input ports and first and second output ports, the first and second input ports being connected to the output terminals of the bridge arms, the first and second output ports being connected to the load;

the method comprising the steps of:

for each of a plurality of consecutive sampling periods determining the duration of a shoot-through period for the next sampling period during which the inverter is in the shoot-through mode; and choosing a configuration of the switches for the next sampling period at the end of the sampling period setting the switches in the chosen configuration for the next sampling period; and at a time during the next sampling period and for the duration of the shoot-through period setting the switches such that the inverter is in shoot-through mode.

2. A method as claimed in claim 1, wherein the switches are set such that the shoot-through period occurs in the center of the next sampling period.

3. A method as claimed in claim 1, wherein the step of determining the duration of the shoot-through period for the next sampling period comprises the steps of:

in the sampling period summing the voltages across the two trunk capacitors to produce a voltage sum;

comparing the voltage sum to a reference voltage sum; and determining the duration of the shoot-through period based on the comparison.

4. A method as claimed in claim 3, wherein the step of determining the duration of the shoot-through period based on the comparison comprises providing the voltage sum and reference voltage sum to a PI controller, the output of the PI controller determining the shoot-through period.

5. A method as claimed in claim 4 wherein the output of the PI controller is voltage limited.

6. A method as claimed in claim 1, wherein the LC filter comprises a first filter line extending from the first filter input to the first filter output, a second filter line extending from the second filter input to the second filter output, a filter inductor connected in series in the first filter line and a filter capacitor connected between the first filter line and second filter line.

7. A method as claimed in claim 6 wherein the step of determining the configuration of the switches for the next sampling period comprises:
  (a) for each switch configuration m in a set of possible switch configurations:
    (i) predicting the current in the filter inductor in the next sampling period k+1,
    (ii) predicting the voltage difference between the two trunk capacitors in the next sampling period k+1, and,
    (iii) calculating a cost function for the switch configuration based at least partly on the predicted current in the filter inductor in the next sampling period and the predicted voltage difference between the two trunk capacitors in the next sampling period; and
  (b) selecting a switch configuration from the set of possible switch configurations based on the cost function for each switch configuration.

8. A method as claimed in claim 7, wherein the selected switch configuration has the lowest cost function.

9. A method as claimed in claim 7, wherein for each switch configuration m in the set of possible switch configurations the voltage difference between the two trunk capacitors in the next sampling period is predicted according to the formula $$\Delta u_c(k+1)_m = \Delta u_c(k) + \frac{T_r}{C_T} d_m i_L(k)$$

where
$\Delta u_c(k+1)_m$ is the voltage difference between the trunk capacitors in the next sampling period k+1 for switch configuration m;
$\Delta u_c(k)$ is the voltage difference between the trunk capacitors in the current sampling period k;
$T_r$ is the non-shoot-through time which is the difference between the duration of the sampling period and duration of the determined shoot-through time for the next sampling period;
$C_T$ is the capacitance of each of the trunk capacitors;
$i_L(k)$ is the current in the filter inductor in the current sampling period; and,
$d_m$ is the neutral point current direction symbol for switch configuration m.

10. A method as claimed in claim 7, wherein for each switch configuration m in the set of possible switch configurations the current in the filter inductor in the next sampling period k+1 is predicted according to the formula $$i_L(k+1)_m = \left(1 - \frac{T_s R_L}{L_f}\right) i_L(k) + \frac{T_r}{L_f} u_m(k) - \frac{T_s}{L_f} u_{cf}(k)$$

where
$I_L(k+1)_m$ is the current in the filter inductor in the next sampling period for switch configuration m;
$T_s$ is the duration of the sampling period;
$R_L$ is the resistance of the load;
$L_f$ is the inductance of the filter inductor;
$i_L(k)$ is the current in the filter inductor in the current sampling period k;
$T_r$ is the non-shoot-through time which is the difference between the duration of the sampling period and duration of the determined shoot-through time for the next sampling period;
$u_m(k)$ is the output voltage between the output terminals of the bridge arms in the current sampling period for switch configuration m; and,
$u_{cf}(k)$ is the load voltage in the current sampling period.

11. A method as claimed in claim 7, wherein the cost function is:

$$g = k_1 [i_{Lref}(k+1) - i_L(k+1)_m]^2 + k_2 [0 - \Delta u_c(k+1)_m]^2$$

where
k1 and k2 are weighting coefficients;
$i_{Lref}(k+1)$ is a predicted reference value for the current in the filter inductor in the next sampling period;
$i_L(k+1)_m$ is the predicted value for the current in the filter inductor in the next sampling period for switch configuration m; and,
$\Delta u_c(k+1)_m$ is the voltage difference between the trunk capacitors in the next sampling period k+1 for switch configuration m.

12. A method as claimed in claim 11, wherein the predicted reference value of the current in the filter inductor in the next sampling period $i_{Lref}(k+1)$ is predicted based on a comparison of the load voltage in the current sampling period with a reference load voltage.

13. A method as claimed in claim 12, wherein the comparison is performed by providing the load voltage and the reference load voltage to a PR controller, the output of the PR controller being the predicted reference value of the current in the next sampling period.

14. A method as claimed in claim 1 wherein the shoot-through mode is a full shoot-through mode in which both the first and second power rails are short circuited to the common point (O).

15. A method as claimed in claim 1, wherein the shoot-through mode is an upper shoot-through mode in which the first power rail is short circuited to the common point (O).

16. A method as claimed in claim 1, wherein the shoot through mode is a lower shoot-through mode in which the second power rail is short circuited to the common point (O).

* * * * *